J. JOHNSON.
Broadcast-Seeder.
No. 66,713. Patented July 16, 1867.
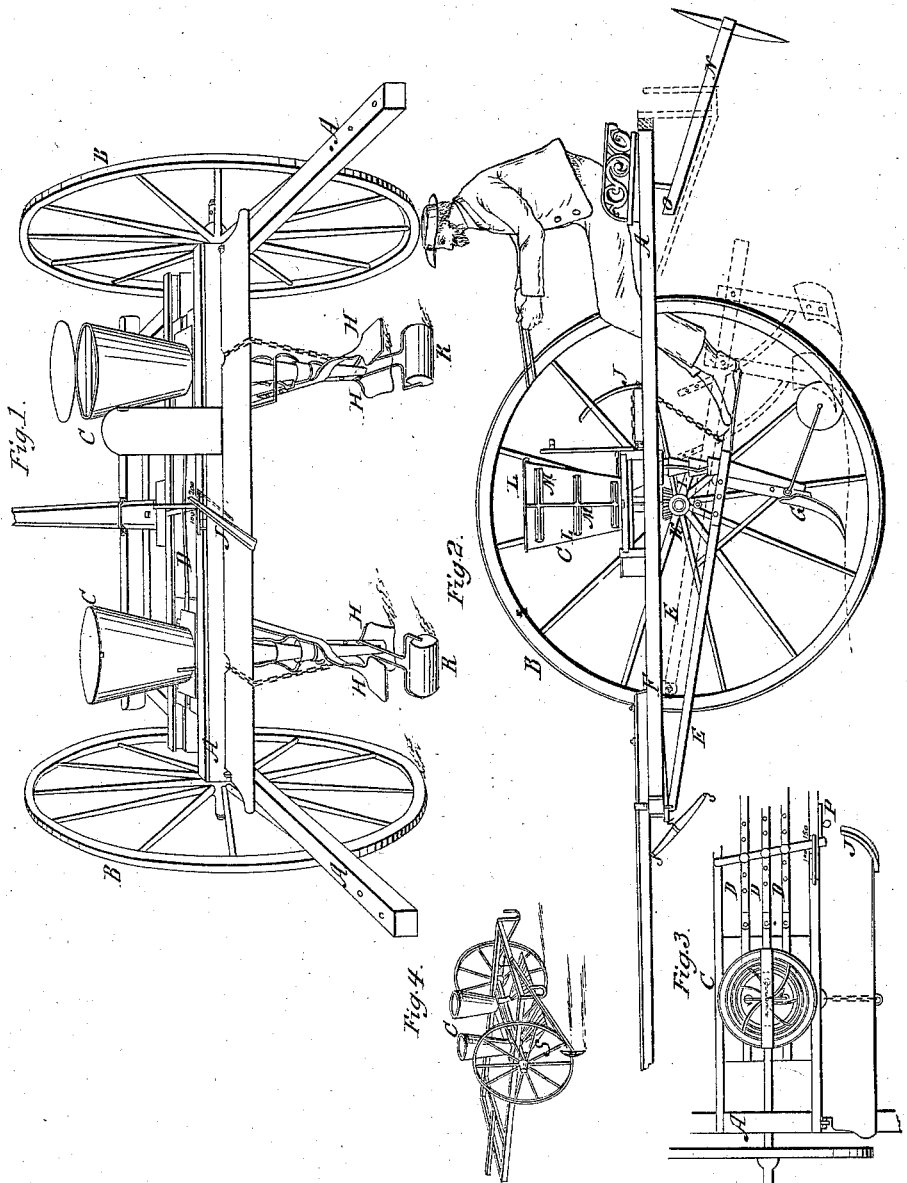

United States Patent Office.

JAMES JOHNSON, OF NORTHAMPTON COUNTY, NORTH CAROLINA.

Letters Patent No. 66,713, dated July 16, 1867

IMPROVEMENT IN COMBINED COTTON-SEED PLANTER AND FERTILIZER-DISTRIBUTER.

The Schedule referred to in these Letters Patent and making part of the same.

TO ALL WHOM IT MAY CONCERN:

Be it known that I, JAMES JOHNSON, of Northampton county, State of North Carolina, have invented an Improved Machine for Distributing Fertilizers, and Ridging and Sowing and Planting Cotton, Corn, and other seeds; and I do hereby declare the following to be an exact description thereof, reference being had to the accompanying drawings, and to the letters of reference marked thereon, making a part of this specification, in which—

Figure 1 represents a perspective view of the machine.

Figure 2, a side elevation.

Figure 3, a top view of the hopper and its adjustable slides.

Figure 4, a view of the apron.

The nature of my invention consists in the combination of the hoppers with the adjustable slides; also, the combination of the teeth, shovels, and adjustable drag-bars to regulate the width of the teeth; also, the construction of the vibrating apron to assist the sowing in broadcast.

A represents the frame; B, the carriage-wheels; C, the hoppers; D, the slides that open and close the apertures of the bottom of the hoppers; E, the drag-bars; F, the regulating or adjustable slides attached to the frame and ends of the drag-bars; G, the teeth or drills; H, the turning-ploughs for forming the ridges; I are the funnel-shaped tubes sliding into each other; J, the lever, with its oblique point for adjusting the slides to close the apertures when turning into another row; K, the gearing on the axle for operating the cylinders L and arm-attachments M on the inside of the hoppers; N, the marker for marking the ground, on either side of the machine, as a guide when returning; P, an adjustable slide, with thumb-screw, for regulating the opening of the apertures in the hopper; R, the rollers for covering the cotton seed; S, the vibrating apron, with grooves diverging from the bottom of each hopper. The machine is peculiarly adapted to the cotton culture, but may be used with equal advantage in the culture of other crops. It is intended to open at the same time two parallel drills or furrows, deposit the fertilizers therein in any given quantity to the acre, and then throw up the ridges or cotton beds over the drills containing the fertilizers by means of two turning-ploughs H H placed immediately behind each shovel-tooth G. The ploughs H have their mould-boards so arranged as to turn the earth toward each other, thus forming the ridge or cotton-bed required for the double machine, viz, the one being now described, two pairs of turning-ploughs making at the same time the two ridges over the fertilizers deposited in the two furrows before referred to. The furrows being opened, the fertilizers therein deposited and the ridges or beds thrown up, the same machine opens the ridges, deposits the cotton seed therein, and covers the same to the requisite depth. This machine moves on wheels, whose diameter is four and a half feet each. The axle is of iron, on which one wheel revolves, but the other is permanently fixed thereon, so that the axle revolves as the machine progresses, for a reason which will be hereafter explained. The frame A of the machine is an oblong parallelogram made of stout oak, hickory, or scantling of other hard wood, the machine moving with the tongue in its greatest longitude. Laterally, the frame has several cross-bars, all parallel, and on which the various devices of the machine are fastened, either above or below. To the first cross-bar two parallel beams or drag-bars E are attached underneath with an adjustable hinge. To the ends of these two drag-bars E, in the rear, are attached two small shovel-teeth or opening-ploughs G, which make the drills for the fertilizer. These two teeth or openers G are made to observe any angle of obliquity to the earth by a graduated rod fastened on the front of the ploughs or openers, and passing through the beams or drag-bar E, to which the tooth G is attached, with holes to lengthen or shorten said rods, by which the angle of the ploughs can be altered at will. Immediately over the axle, and near the middle of the machine, there are placed on either side, and over each shovel-tooth, two sheet-iron hoppers, C, to contain either the fertilizer or the seed, and each hopper C has in the bottom three square apertures, which are shut or closed by iron slides D. When the fertilizer is being deposited it is only necessary to open one aperture to any number marked on the scale, which indicates the number of pounds that will be deposited to the acre when opened to that number, (say one hundred.) When the cotton seed are being planted it is necessary to open all the apertures, which is easily done by throwing into gear the horizontal lever, which works the three, or either one, as desired, by an adjustable arrangement whereby they can be thrown in or out of gear. In each of the hoppers there is an upright shaft passing from the axle up through the centre of the hopper, each shaft being furnished with cylinders and arms, M, attached, which are caused to revolve and make the cotton seed or fertilizer pass through the apertures by means of four oblique pinions, two of which are permanently fixed on the axle, with one on the end of each shaft, so that the revolution of the axle keeps, while revolving, the two shafts in motion, causing the fertilizer or cotton seed to fall through tubes behind and attached to each tooth G into the furrows prepared for them. When the fertilizers are being sown two turning-ploughs H are attached on either side, immediately behind each tooth G, and in like manner to the ends of drag-bars E. The ploughs H are so arranged that one works in advance of the other, but running on parallel lines. Without such arrangement the two ploughs turning toward each other might clog. The ridges being formed, the two pairs of turning-ploughs H are removed and two rollers R are added to close the furrow for the cotton-seed and cover the same. The two teeth or drill-openers G, for opening the drills for the fertilizer, are also removed and a narrower tooth supplied. When it is desired to sow the fertilizer broadcast the plough arrangements are all removed and a corrugated apron, S, of zinc is suspended under the hoppers by means of hooks at an angle of forty-five degrees, which, by an eccentric gearing arrangement on the axle, where one or more pins projecting through the axle are made to strike an oblique projection on the upper anterior edge of the apron, giving it a vibrating motion, causing the fertilizer passing down the grooves or corrugations to be distributed with exact precision broadcast on the space between the wheels. The ploughs before described are all, by means of levers, entirely under the control of the driver, and when necessary are lifted clear of the ground in turning into another row. The operation of the lever controls the apertures in the hoppers, closing them at the end of the row, thereby avoiding a loss of the fertilizer or seed. The levers lifting the teeth or drill-openers and the ridging-ploughs are thus described, viz: The two drag-bars first named descend obliquely from the first cross-bar toward the ground, each terminating in a step on which the driver's feet rest and by which he regulates the depth of all the ploughs. Two other drag-bars on each side run parallel with the first, and to which the four turning-ploughs are attached to the ends of the first two. Just before the steps two chains are attached, which are also attached to the lever-board in front of the driver. Two pins passing over the drag-bars, to which the drill-openers are attached, fasten together each pair of drag-bars, on the ends of which are the ridging-ploughs, placing all the ploughs under the control of one lever, so that when the driver lifts his board-lever from a horizontal to a perpendicular the board is held in position by a spring catch. The oblique projection on the board strikes the handle of the slide that closes the hoppers and lifts at the same moment all the ploughs from the ground. To avoid the trouble and loss of time in driving by stakes, a marker, N, is attached to the machine, immediately behind the driver's seat, which is made reversible and adjustable by a bolt attaching it to the rear cross-bar of the machine, so that it can be shifted from side to side, falling into an iron rest on each side designed to hold the marker and resist the backward strain on the shaft by the furrow of the marking tooth. The driver in returning keeps the tongue of the vehicle immediately over the mark made by the marker N, which should be so adjusted, when the vehicle is driven as directed, the rows shall be all equidistant.

The foregoing principles will be applied to the single and cheaper machine, to be used with one tooth or drill-opener, one hopper, and one pair of ridge-openers. The machine being worked on very low wheels, the two ridges will be governed by the driver, being supplied with handles, as in the ordinary plough. The driver, who walks after the machine and holds the handles, can elevate or depress them at will. At the end of the row the two handles become a brake, and are lifted from the ground into a spring-catch, which shuts off the fertilizer, as in the double machine, and lifts the ploughs out of the ground. The fertilizer being deposited and the ridge formed, it is only necessary to remove the ridgers or ploughs H, attach the roller R, as in the double machine, and plant the cotton seed.

What I claim as my invention, and desire to secure by Letters Patent, is—

1. The combination of the teeth G and ploughs H with their adjustable drag-bars E and rollers R, as herein described and for the purposes set forth.

2. I also claim the arrangement and combination of the hoppers C with their adjustable slides D, and operated by the lever J, as herein described and for the purposes set forth.

3. I also claim the vibrating apron S, with its diverging grooves, for the purpose of sowing broadcast.

JAS. JOHNSON.

Witnesses:
J. FRANKLIN REIGART,
JOHN S. HOLLINGSHEAD.